(12) United States Patent
Wei et al.

(10) Patent No.: US 11,653,664 B2
(45) Date of Patent: May 23, 2023

(54) PREPARATION METHOD FOR FUNCTIONAL BEVERAGE OF DARK TEA WITH ZERO ENERGY FOR REDUCING WEIGHT AND LIPID

(71) Applicants: Shanghai Jiao Tong University, Shanghai (CN); Shanghai Normal University, Shanghai (CN); Shanghai Xiyuan Biotechnology Co., Ltd., Shanghai (CN)

(72) Inventors: Xinlin Wei, Shanghai (CN); Lizeng Cheng, Shanghai (CN); Yuanfeng Wang, Shanghai (CN); Kang Wei, Shanghai (CN); Xin Ye, Shanghai (CN)

(73) Assignees: SHANGHAI JIAO TONG UNIVERSITY, Shanghai (CN); SHANGHAI NORMAL UNIVERSITY, Shanghai (CN); SHANGHAI XIYUAN BIOTECHNOLOGY CO., LTD., Shanghai (CN)

(*) Notice: Subject to any disclaimer, the term of this patent is extended or adjusted under 35 U.S.C. 154(b) by 125 days.

(21) Appl. No.: 17/117,792

(22) Filed: Dec. 10, 2020

(65) Prior Publication Data
US 2021/0329937 A1    Oct. 28, 2021

(30) Foreign Application Priority Data
Apr. 23, 2020  (CN) .......................... 202010324712.4

(51) Int. Cl.
*A23F 3/14* (2006.01)
*A23F 3/32* (2006.01)
(Continued)

(52) U.S. Cl.
CPC .................. *A23F 3/14* (2013.01); *A23F 3/18* (2013.01); *A23F 3/20* (2013.01); *A23F 3/22* (2013.01); *A23F 3/32* (2013.01)

(58) Field of Classification Search
CPC ...... A23F 3/14; A23F 3/18; A23F 3/20; A23F 3/22; A23F 3/32
See application file for complete search history.

(56) References Cited

U.S. PATENT DOCUMENTS

2017/0283164 A1* 10/2017 Aranoz ................ B65D 85/808

FOREIGN PATENT DOCUMENTS

| CN | 101278692 | * 10/2008 |
| CN | 105747059 | *  7/2016 |

(Continued)

OTHER PUBLICATIONS

English Translation for CN105747059 published Jul. 2016.*
English Translation for CN107319054 published Nov. 2017.*

*Primary Examiner* — Anthony J Weier
(74) *Attorney, Agent, or Firm* — M&B IP Analysts, LLC

(57) ABSTRACT

The present disclosure provides a functional beverage of dark tea with zero energy for reducing weight and lipid and a preparation method thereof, and relates to the technical field of processing health-promoting beverage. The functional beverage includes 1.5-3.5 parts of dark tea, 0.3-0.7 parts of mulberry leaf, 0.1-0.5 parts of lotus leaf, 0.1-0.3 parts of stevia leaf, and 95.4-97.4 parts of purified water. The preparation process thereof includes treatment of raw materials, circulatory microwave extraction, static settlement, membrane ultrafiltration, and ultra-high temperature instantaneous sterilization (UHT). Compared with the prior art, the functional beverage uses purely natural herb plants without any additives. The obtained product has zero sugar while has the effects of quenching thirst and reducing weight and lipid. Key technologies such as integrated formula, circulatory (Continued)

microwave extraction, and membrane ultrafiltration enable the best flavor and efficacy of the beverage.

5 Claims, 1 Drawing Sheet

(51) Int. Cl.
  *A23F 3/18* (2006.01)
  *A23F 3/20* (2006.01)
  *A23F 3/22* (2006.01)

(56) References Cited

FOREIGN PATENT DOCUMENTS

| CN | 107319054 | * | 11/2017 |
| CN | 110150521 | * | 8/2019 |
| JP | 2011160715 | * | 8/2011 |

* cited by examiner

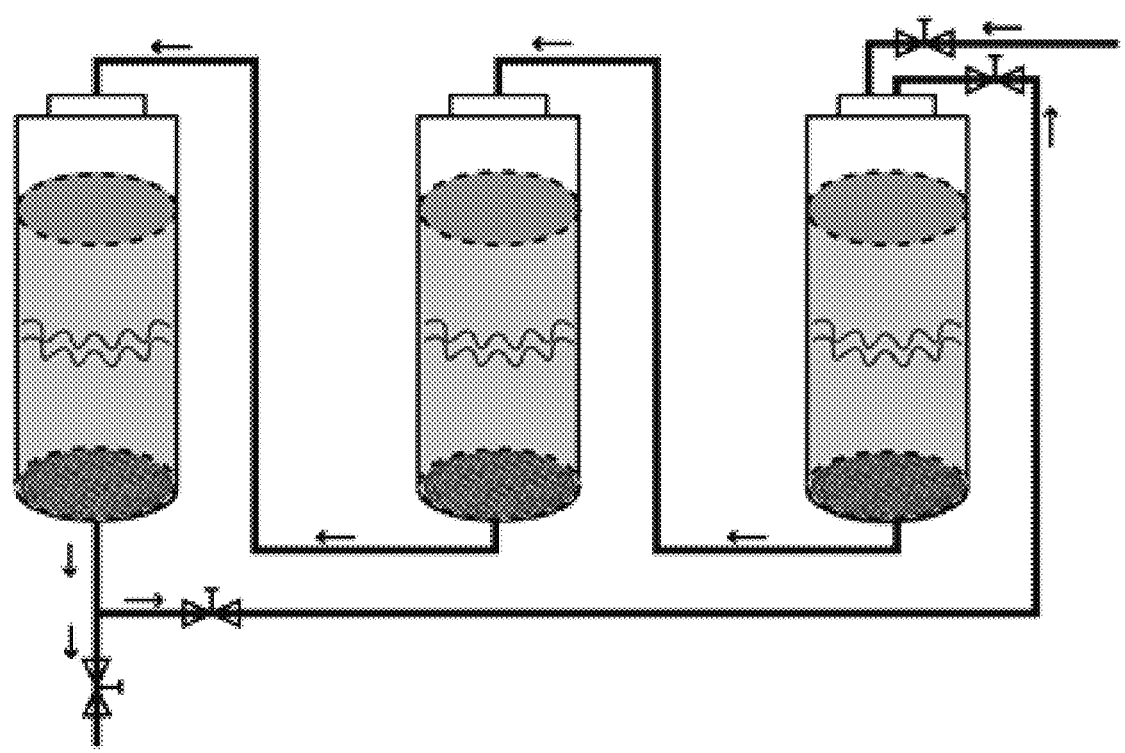

PREPARATION METHOD FOR FUNCTIONAL BEVERAGE OF DARK TEA WITH ZERO ENERGY FOR REDUCING WEIGHT AND LIPID

CROSS REFERENCE TO RELATED APPLICATION

This application claims priority under 35 U.S.C. 119 to the Chinese Application No. 202010324712.4, filed Apr. 23, 2020, the entirety of which is incorporated by reference herein.

TECHNICAL FIELD

The present disclosure relates to the technical field of processing health-promoting beverage, in particular to a functional beverage of dark tea with zero energy for reducing weight and lipid and a preparation method thereof.

BACKGROUND

Dark tea is one of the six major teas (namely, green tea, oolong tea, yellow tea, white tea, black tea, and dark tea) in China. It is a post-fermented tea mainly produced in provinces such as Yunnan, Hunan, Hubei, and Guangxi in China. The dark tea contains a variety of functional ingredients such as theabrownins, tea polysaccharides, and theanine, and exhibits significant weight- and lipid-reducing effect.

As a beverage, dark tea is easy to process and convenient for drinking, and has many health-promoting benefits. However, the disclosed functional beverages of dark tea for reducing weight and lipid and preparation technology thereof have problems as follows: (1) The disclosed functional beverages of dark tea for reducing weight and lipid contain chemically synthesized weight- and fat-reducing ingredients and other chemical additives. These chemical additives are against the green and healthy concept and may have potential safety problems. For example, the Chinese invention patent CN201811199493.0 discloses an anti-hygroscopic solid beverage of dark tea for reducing weight and a preparation method, and the Chinese invention patent CN201410383219.4 discloses a solid instant beverage of dark tea for reducing lipid, sugar and weight and a preparation method thereof. These beverages contained weight-reducing ingredients such as L-carnitine, or added sweetener. (2) The disclosed functional beverages of dark tea for reducing weight and lipid are prepared by traditional preparation processes which were extracted at an excessively high temperature for an excessively long time, resulting in flavor distortion. Moreover, flocculation and sedimentation generating during the sterilization and storage badly affect the quality of tea beverage. Its low technical level also leads to difficulties in achieving industrial production. For example, the Chinese invention patent CN201410383219.4 discloses a solid instant beverage of dark tea for reducing lipid, sugar and weight and a preparation method thereof, and the Chinese invention patent CN201910990435.8 discloses a dark tea beverage for reducing lipid and weight and a preparation method thereof. These beverages of dark tea for reducing lipid and weight are prepared by preparation processes including traditional decoction, hot water reflux extraction, and so on. Since the extraction or decoction was at a high temperature for a long time, its taste adaptability is poor. Its low technical level also leads to difficulties in achieving modern industrial production. For example, the Chinese invention patent CN200910162782.8 discloses a mixed beverage of black tea and dark tea for reducing weight and lipid and supplementing qi for man, and the Chinese invention patent CN201310077921.3 discloses a dark tea beverage for reducing weight and lipid and a preparation method thereof. Both functional beverages of dark tea for reducing weight and lipid fail to remove tannin, pectin, or other ingredients which may easily result in flocculation and sedimentation during the sterilization and storage.

SUMMARY

An objective of the present disclosure is to provide a functional beverage of dark tea with zero energy for reducing weight and lipid and a preparation method thereof. The beverage is purely natural with zero energy and zero additives, which can overcome the defects of existing tea beverage, such as high sugar content and high energy which can easily result in obesity, and multiple additives which bring safety concerns. This technical disclosure for the first time proposes an integrated formula that can effectively extract the weight- and lipid-reducing ingredients of dark tea, mulberry leaf, and lotus leaf and treat diseases such as obesity and hyperlipidemia. Existing processing technology of beverage has many defects such as insufficient aroma, bitter and astringent taste, poor acceptance of flavors, flocculation, sedimentation and turbidity during sterilization and storage, insufficient utilization of active ingredients of herbal plants, and insignificant health-promoting functions. In view of these defects, ultra-low temperature extraction technology, optimized static settlement technology, and ultra-high temperature instantaneous sterilization (UHT) technology are adopted.

The objective of the present disclosure can be achieved according to the following technical solutions.

A functional beverage of dark tea with zero energy for reducing weight and lipid includes dark tea, mulberry leaf, lotus leaf, stevia leaf, and purified water.

Further, the functional beverage of dark tea with zero energy for reducing weight and lipid may include the following components in parts by weight: 1.5-3.5 parts of dark tea, 0.3-0.7 parts of mulberry leaf, 0.1-0.5 parts of lotus leaf, 0.1-0.3 parts of stevia leaf, and 95.4-97.4 parts of purified water.

Further, the dark tea may be one or more of Pu-erh tea, Fuzhuan tea, Qingzhuan tea, and Liubao tea.

A method for preparing the functional beverage of dark tea with zero energy for reducing weight and lipid includes the following steps:

step (1): treatment of raw materials: pulverizing dark tea, mulberry leaf, lotus leaf, and stevia leaf separately, screening through a 40 mesh sieve, and mixing in determined amounts uniformly to obtain a raw tea mixture;

step (2): circulatory microwave extraction: mixing the raw tea mixture with purified water in determined amounts uniformly, carrying out circulatory extraction for 10-30 min with microwave power of 400-600 W, and filtering an extract through a 100 mesh sieve and a 300 mesh sieve in sequence;

step (3): static settlement: allowing a filtrate to be statically settled for 8-12 h at 2-8° C. and centrifuged at 4° C. to remove flocs;

step (4): membrane ultrafiltration: subjecting a supernatant to ultrafiltration with a 10-100 kDa semi-permeable membrane to further remove impurities to prevent flocculation during beverage sterilization and storage;

step (5): UHT: sterilizing by heating a permeate at 135-150° C. for 2-8 s to obtain a functional beverage of dark tea.

Further, in the circulatory microwave extraction of step (2), the extraction may be carried out for 10-30 min with microwave power of 400-600 W, and the filtering in step (2) may be carried out by coarse filtering through a 100 mesh sieve and fine filtering through a 300 mesh sieve.

Further, in the membrane ultrafiltration of step (4), the semi-permeable membrane may have a pore size of 10-100 kDa.

Further, in the UHT of step (5), the sterilizing by heating may be carried out at 135-150° C. for 2-8 s.

Key points of the present disclosure are as follows: on the basis of study of a functional formula for reducing weight and lipid, a response surface test design is adopted to optimize proportions of plants having a weight- and lipid-reducing function in the formula to achieve best flavor of the functional beverage. Advanced technologies such as microwave circulatory extraction, optimized static settlement, and membrane ultrafiltration are applied to investigate the key control points such as microwave power, extraction time, temperature for static settlement, pore size of semi-permeable membrane, so that active ingredients of herbal plants for reducing weight and lipid can be greatly dissolved while flocculation and sedimentation don't appear during sterilization and storage of the functional beverage.

Compared with the prior art, the present disclosure has innovation and advancement as follows:

(1) The present disclosure uses an original integrated formula. The functional beverage is prepared from the selected herbal plants with significant weight- and lipid-reducing effects. No sugar and no additives are added. An obtained product is purely natural and sugar-free, with zero energy.

(2) The present disclosure for the first time proposes circulatory microwave extraction. Electromagnetic waves with a high frequency penetrate extraction medium and reach vascular bundle and cell system inside the raw materials (dark tea, mulberry leaf, lotus leaf, and stevia leaf). Cells absorb microwave energy and their internal temperature rise rapidly. As a result, the pressure inside the cells is so high that the cells rupture, with active components in the cells flowing out. This technology enables the extraction of active ingredients from the raw materials to a great extent at a relatively low temperature, and doesn't destroy the flavor of the beverage.

(3) The present disclosure adopts optimized static settlement combined with membrane ultrafiltration, which can effectively avoid flocculation and sedimentation during the sterilization and storage of the functional beverage.

BRIEF DESCRIPTION OF DRAWINGS

FIG. 1 is a schematic diagram of structure of a circulatory microwave extraction device used in the present disclosure.

DETAILED DESCRIPTION

The present disclosure is described in detail below with reference to the accompanying drawings and specific embodiments. The embodiments of the present disclosure are based on technical solutions of the present disclosure, and detailed implementations and specific operation processes are given, but the protection scope of the present disclosure is not limited to the following embodiments.

Embodiment 1

A functional beverage of dark tea with zero energy for reducing weight and lipid included the following components in parts by weight: 2.0 parts of Pu-erh tea, 0.6 parts of mulberry leaf, 0.3 parts of lotus leaf, 0.1 parts of stevia leaf, and 97.0 parts of purified water.

A method for preparing the functional beverage of dark tea was carried out as follows:

Step (1): treatment of raw materials: Pu-erh tea, mulberry leaf, lotus leaf, and stevia leaf were separately pulverized, screened through a 40 mesh sieve, and mixed in determined amounts uniformly to obtain a raw tea mixture.

Step (2): circulatory microwave extraction: the raw tea mixture was mixed with purified water in determined amounts uniformly, and placed in a circulatory microwave extraction device as shown in FIG. 1. Circulatory extraction was carried out for 15 min with microwave power of 600 W. An extract was filtered through a 100 mesh sieve and a 300 mesh sieve in sequence.

Step (3): static settlement: a filtrate was allowed to be statically settled at 4° C. for 12 h and centrifuged at 4° C. to remove flocs.

Step (4): membrane ultrafiltration: a supernatant was subjected to ultrafiltration with a 100 kDa semi-permeable membrane to further remove impurities to prevent flocculation during beverage sterilization and storage.

Step (5): UHT: heating was carried out at 135° C. for 6 s to achieve sterilization to obtain a functional beverage of dark tea.

Embodiment 2

A functional beverage of dark tea with zero energy for reducing weight and lipid included the following components in parts by weight: 1.5 parts of Fuzhuan tea, 0.6 parts of mulberry leaf, 0.3 parts of lotus leaf, 0.2 parts of stevia leaf, and 97.4 parts of purified water.

A method for preparing the functional beverage of dark tea was carried out as follows:

Step (1): treatment of raw materials: Fuzhuan tea, mulberry leaf, lotus leaf, and stevia leaf were separately pulverized, screened through a 40 mesh sieve, and mixed in determined amounts uniformly to obtain a raw tea mixture.

Step (2): circulatory microwave extraction: the raw tea mixture was mixed with purified water in determined amounts uniformly, and placed in a circulatory microwave extraction device as shown in FIG. 1. Circulatory extraction was carried out for 20 min with microwave power of 500 W. An extract was filtered through a 100 mesh sieve and a 300 mesh sieve in sequence.

Step (3): static settlement: a filtrate was allowed to be statically settled at 2° C. for 8 h and centrifuged at 4° C. to remove flocs.

Step (4): membrane ultrafiltration: a supernatant was subjected to ultrafiltration with a 10 kDa semi-permeable membrane to further remove impurities to prevent flocculation during beverage sterilization and storage.

Step (5): UHT: heating was carried out at 140° C. for 6 s to achieve sterilization to obtain a functional beverage of dark tea.

Embodiment 3

A functional beverage of dark tea with zero energy for reducing weight and lipid included the following components in parts by weight: 2.5 parts of Qingzhuan tea, 0.6 parts of mulberry leaf, 0.3 parts of lotus leaf, 0.1 parts of stevia leaf, and 96.5 parts of purified water.

A method for preparing the functional beverage of dark tea was carried out as follows:

Step (1): treatment of raw materials: Qingzhuan tea, mulberry leaf, lotus leaf, and stevia leaf were separately pulverized, screened through a 40 mesh sieve, and mixed in determined amounts uniformly to obtain a raw tea mixture.

Step (2): circulatory microwave extraction: the raw tea mixture was mixed with purified water in determined amounts uniformly, and placed in a circulatory microwave extraction device as shown in FIG. 1. Circulatory extraction was carried out for 30 min with microwave power of 400 W. An extract was filtered through a 100 mesh sieve and a 300 mesh sieve in sequence.

Step (3): static settlement: a filtrate was allowed to be statically settled at 5° C. for 9 h and centrifuged at 4° C. to remove flocs.

Step (4): membrane ultrafiltration: a supernatant was subjected to ultrafiltration with a 100 kDa semi-permeable membrane to further remove impurities to prevent flocculation during beverage sterilization and storage.

Step (5): UHT: heating was carried out at 150° C. for 2 s to achieve sterilization to obtain a functional beverage of dark tea.

Embodiment 4

A functional beverage of dark tea with zero energy for reducing weight and lipid included the following components in parts by weight: 1.9 parts of Liubao tea, 0.5 parts of mulberry leaf, 0.1 parts of lotus leaf, 0.1 parts of stevia leaf, and 97.4 parts of purified water.

A method for preparing the functional beverage of dark tea was carried out as follows:

Step (1): treatment of raw materials: Liubao tea, mulberry leaf, lotus leaf, and stevia leaf were separately pulverized, screened through a 40 mesh sieve, and mixed in determined amounts uniformly to obtain a raw tea mixture.

Step (2): circulatory microwave extraction: the raw tea mixture was mixed with purified water in determined amounts uniformly, and placed in a circulatory microwave extraction device as shown in FIG. 1. Circulatory extraction was carried out for 15 min with microwave power of 450 W. An extract was filtered through a 100 mesh sieve and a 300 mesh sieve in sequence.

Step (3): static settlement: a filtrate was allowed to be statically settled at 5° C. for 12 h and centrifuged at 4° C. to remove flocs.

Step (4): membrane ultrafiltration: a supernatant was subjected to ultrafiltration with a 100 kDa semi-permeable membrane to further remove impurities to prevent flocculation during beverage sterilization and storage.

Step (5): UHT: heating was carried out at 145° C. for 6 s to achieve sterilization to obtain a functional beverage of dark tea.

Embodiment 5

A functional beverage of dark tea with zero energy for reducing weight and lipid included the following components in parts by weight: 1.0 part of Pu-erh tea, 1.5 parts of Qingzhuan tea, 0.7 parts of mulberry leaf, 0.4 parts of lotus leaf, 0.3 parts of stevia leaf and 96.1 parts of purified water.

A method for preparing the functional beverage of dark tea was carried out as follows:

Step (1): treatment of raw materials: Pu-erh tea, Qingzhuan tea, mulberry leaf, lotus leaf, and stevia leaf were separately pulverized, screened through a 40 mesh sieve, and mixed in determined amounts uniformly to obtain a raw tea mixture.

Step (2): circulatory microwave extraction: the raw tea mixture was mixed with purified water in determined amounts uniformly, and placed in a circulatory microwave extraction device as shown in FIG. 1. Circulatory extraction was carried out for 20 min with microwave power of 450 W. An extract was filtered through a 100 mesh sieve and a 300 mesh sieve in sequence.

Step (3): static settlement: a filtrate was allowed to be statically settled at 6° C. for 9 h and centrifuged at 4° C. to remove flocs.

Step (4): membrane ultrafiltration: a supernatant was subjected to ultrafiltration with a 100 kDa semi-permeable membrane to further remove impurities to prevent flocculation during beverage sterilization and storage.

Step (5): UHT: heating was carried out at 140° C. for 7 s to achieve sterilization to obtain a functional beverage of dark tea.

Embodiment 6

A functional beverage of dark tea with zero energy for reducing weight and lipid included the following components in parts by weight: 0.5 parts of Fuzhuan tea, 1.0 part of Qingzhuan tea, 0.5 parts of Liubao tea, 0.6 parts of mulberry leaf, 0.3 parts of lotus leaf, 0.2 parts of stevia leaf, and 96.9 parts of purified water.

A method for preparing the functional beverage of dark tea was carried out as follows:

Step (1): treatment of raw materials: Fuzhuan tea, Qingzhuan tea, Liubao tea, mulberry leaf, lotus leaf, and stevia leaf were separately pulverized, screened through a 40 mesh sieve, and mixed in determined amounts uniformly to obtain a raw tea mixture.

Step (2): circulatory microwave extraction: the raw tea mixture was mixed with purified water in determined amounts uniformly, and placed in a circulatory microwave extraction device as shown in FIG. 1. Circulatory extraction was carried out for 20 min with microwave power of 500 W. An extract was filtered through a 100 mesh sieve and a 300 mesh sieve in sequence.

Step (3): static settlement: a filtrate was allowed to be statically settled at 2° C. for 8 h and centrifuged at 4° C. to remove flocs.

Step (4): membrane ultrafiltration: a supernatant was subjected to ultrafiltration with a 10 kDa semi-permeable membrane to further remove impurities to prevent flocculation during beverage sterilization and storage.

Step (5): UHT: heating was carried out at 140° C. for 6 s to achieve sterilization to obtain a functional beverage of dark tea.

Embodiment 7

A functional beverage of dark tea with zero energy for reducing weight and lipid included the following components in parts by weight: 0.5 parts of Pu-erh tea, 1.0 part of Fuzhuan tea, 1.0 part of Qingzhuan tea, 1.0 part of Liubao tea, 0.3 parts of mulberry leaf, 0.5 parts of lotus leaf, 0.3 parts of stevia leaf and 95.4 parts of purified water.

A method for preparing the functional beverage of dark tea was carried out as follows:

Step (1): treatment of raw materials: Pu-erh tea, Fuzhuan tea, Qingzhuan tea, Liubao tea, mulberry leaf, lotus leaf, and stevia leaf were separately pulverized, screened through a 40 mesh sieve, and mixed in determined amounts uniformly to obtain a raw tea mixture.

Step (2): circulatory microwave extraction: the raw tea mixture was mixed with purified water in determined amounts uniformly, and placed in a circulatory microwave extraction device as shown in FIG. 1. Circulatory extraction was carried out for 10 min with microwave power of 600 W. An extract was filtered through a 100 mesh sieve and a 300 mesh sieve in sequence.

Step (3): static settlement: a filtrate was allowed to be statically settled at 2° C. for 8 h and centrifuged at 4° C. to remove flocs.

Step (4): membrane ultrafiltration: a supernatant was subjected to ultrafiltration with a 50 kDa semi-permeable membrane to further remove impurities to prevent flocculation during beverage sterilization and storage.

Step (5): UHT: heating was carried out at 140° C. for 6 s to achieve sterilization to obtain a functional beverage of dark tea.

The above description of the embodiments is intended to facilitate a person of ordinary skill in the art to understand and use the present disclosure. Obviously, a person skilled in the art can easily make various modifications to these embodiments, and apply a general principle described herein to other embodiments without creative efforts. Therefore, the present disclosure is not limited to the above embodiments. All improvements and modifications made by a person skilled in the art according to the implication of the present disclosure without departing from the spirit of the present disclosure should fall within the protection scope of the present disclosure.

What is claimed is:

1. A method for preparing a functional beverage of dark tea with zero energy for reducing weight and lipid, comprising the following steps:
   step (1): treatment of raw materials: pulverizing dark tea, mulberry leaf, lotus leaf, and stevia leaf separately, screening through a 40 mesh sieve, and mixing in determined amounts uniformly to obtain a raw tea mixture;
   step (2): circulatory microwave extraction: mixing the raw tea mixture with purified water in determined amounts uniformly, carrying out circulatory extraction for 10-30 min with microwave power of 400-600 W, and filtering an extract through a 100 mesh sieve and a 300 mesh sieve in sequence;
   step (3): static settlement: allowing a filtrate to be statically settled for 8-12 h at 2-8° C. and centrifuged at 4° C. to remove flocs;
   step (4): membrane ultrafiltration: subjecting a supernatant to ultrafiltration with a 10-100 kDa semi-permeable membrane to further remove impurities, preventing flocculation during beverage sterilization and storage;
   step (5): ultra-high temperature instantaneous sterilization (UHT): sterilizing by heating a permeate at 135-150° C. for 2-8 s to obtain a functional beverage of dark tea,
   wherein the functional beverage includes following components in parts by weight: 1.5-3.5 parts of dark tea, 0.3-0.7 parts of mulberry leaf, 0.1-0.5 parts of lotus leaf, 0.1-0.3 parts of stevia leaf, and 95.4-97.4 parts of purified water.

2. The method according to claim 1, wherein, in the circulatory microwave extraction of step (2), the extraction is carried out for 10-30 min with microwave power of 400-600 W, and the filtering in step (2) is carried out by coarse filtering through a 100 mesh sieve and fine filtering through a 300 mesh sieve.

3. The method according to claim 1, wherein, in the membrane ultrafiltration of step (4), the semi-permeable membrane has a pore size of 10-100 kDa.

4. The method according to claim 3, wherein, in the UHT of step (5), the sterilizing by heating is carried out at 135-150° C. for 2-8 s.

5. The method according to claim 1, wherein the dark tea is at least one of: Pu-erh tea, Fuzhuan tea, Qingzhuan tea, and Liubao tea.

* * * * *